United States Patent
Croxford et al.

(10) Patent No.: US 11,948,255 B2
(45) Date of Patent: Apr. 2, 2024

(54) FOVEATION FOR A HOLOGRAPHIC IMAGING SYSTEM

(71) Applicant: Arm Limited, Cambridge (GB)

(72) Inventors: Daren Croxford, Cambridgeshire (GB); Roberto Lopez Mendez, Cambridgeshire (GB)

(73) Assignee: Arm Limited, Cambridge (GB)

( * ) Notice: Subject to any disclaimer, the term of this patent is extended or adjusted under 35 U.S.C. 154(b) by 229 days.

(21) Appl. No.: 17/650,972

(22) Filed: Feb. 14, 2022

(65) Prior Publication Data
US 2022/0262079 A1    Aug. 18, 2022

(30) Foreign Application Priority Data
Feb. 17, 2021    (GB) ..................... 2102254

(51) Int. Cl.
*G06T 19/00* (2011.01)
*G06F 3/01* (2006.01)
*G06T 3/4046* (2024.01)
*G06V 10/764* (2022.01)

(52) U.S. Cl.
CPC ............ *G06T 19/006* (2013.01); *G06F 3/013* (2013.01); *G06T 3/4046* (2013.01); *G06V 10/764* (2022.01); *G06T 2207/10016* (2013.01)

(58) Field of Classification Search
None
See application file for complete search history.

(56) References Cited

U.S. PATENT DOCUMENTS

| | | | |
|---|---|---|---|
| 2010/0315423 A1 | 12/2010 | Ahn et al. | |
| 2016/0379606 A1* | 12/2016 | Kollin | G03H 1/2294 345/428 |
| 2019/0026864 A1* | 1/2019 | Chen | G06T 3/4053 |

FOREIGN PATENT DOCUMENTS

EP    2769270 A1 *    8/2014    ............... A61B 1/00

OTHER PUBLICATIONS

United Kingdom Combined Search and Examination report dated Dec. 2, 2021 for United Kingdom Application No. GB2102254.6.
Horwitz, Jeremy, "Magic Leap One teardown reveals 6-layerdisplay and video projectors", VentureBeat, Aug. 23, 2018.

(Continued)

*Primary Examiner* — Tapas Mazumder
(74) *Attorney, Agent, or Firm* — EIP US LLP (57) ABSTRACT

An image processing system for an extended reality, XR, device comprising an eye-tracking subsystem, for determining a focus region of the eye, and a processor. The processor is configured to process application data to render image content for an application for display on the XR device, and obtain metadata indicating that a virtual object is to be generated as a hologram as part of the image content for display. Based on a determination that the virtual object belongs to a predetermined class of objects and is to be displayed in the focus region, the processor performs, using a neural network corresponding to the predetermined class of objects, foveated processing of the image content, including at least part of the hologram, such that relatively high-quality image content is generated for display in the focus region and relatively low-quality image content is generated for display outside the focus region.

20 Claims, 3 Drawing Sheets

(56) References Cited

OTHER PUBLICATIONS

Yeon-Gyeong et al., "Foveated computer computer-generated hologram and its progressive update using triangular mesh scene model for near near-eye displays", Optics Express, vol. 27, No. 17, Aug. 19, 2019.
Kaplanyan et al., "DeepFovea: Neural Reconstruction for Foveated Rendering and Video Compression using Learned Statistics of Natural Videos", pp. 1-13, ACM Trans. Graph., vol. 38, No. 4, Jul. 1, 2019.
Hong et al., "Gaze contingent hologram synthesis for holographic head-mounted display", Proceedings of SPIE, vol. 9771, pp. 1-9, Mar. 7, 2016.
Cem et al., "Foveated near-eye display using computational holography", Optical Microsystems Laboratory, Electrical and Electronics Engineering Department, Koç University, 34450 Istanbul, Turkey, pp. 1-9, Sep. 10, 2020.
Heok et al., "A Review on Level of Detail", Proceedings of the International Conference on Computer Graphics, Imaging and Visualization (CGIV'04), pp. 70-75, Jul. 26, 2004.
Cognard et al., "A Review of Resolution Losses for AR/VR Foveated Imaging Applications", Institute of Electrical and Electronics Engineers, pp. 1-9, Aug. 15, 2018.
Chang et al., "Toward the next-generation VR/AR optics: a review of holographic near-eye displays from a human-centric perspective", vol. 7, No. 11, Nov. 6, 2020.

* cited by examiner

FOVEATION FOR A HOLOGRAPHIC IMAGING SYSTEM

CROSS-REFERENCE TO RELATED APPLICATIONS

This application claims priority pursuant to 35 U.S.C. 119(a) to United Kingdom Patent Application No. 2102254.6, filed Feb. 17, 2021, which application is incorporated herein by reference in its entirety.

TECHNICAL FIELD

The present invention relates to an imaging system for an extended reality device, and a method of controlling such.

BACKGROUND

Many electronic devices can display visual content to a user, such as image, text, or video content. Such display devices range from the relatively large, such as televisions, to the relatively small and portable, such as smartphones and smart watches. Known devices for displaying visual content to a user include head-mounted displays (HMDs). HMDs may be used for various purposes, including augmented reality (AR), mixed reality (MR) and virtual reality (VR), which collectively fall within the umbrella term "extended reality" (XR) used to describe immersive technologies that can merge the physical and virtual world in a manner that extends the reality that humans can experience.

SUMMARY

According to a first aspect, there is provided an image processing system for an extended reality, XR, device, the image processing system comprising:
  an eye-tracking subsystem configured to track an eye of a user for determining a focus region of the eye;
  at least one processor configured to:
    process application data to render image content for an application for display on the XR device;
    obtain metadata indicating that a virtual object is to be generated as a hologram as part of the image content for display;
    based on a determination that the virtual object belongs to a predetermined class of objects and is to be displayed in the focus region:
    perform, using a neural network corresponding to the predetermined class of objects, foveated processing of the image content, including at least part of the hologram, such that relatively high-quality image content is generated for display in the focus region and relatively low-quality image content is generated for display outside the focus region.

According to a first aspect, there is provided a method of controlling an image processing system for an extended reality, XR, device, the method comprising:
  tracking an eye of a user, for determining a focus region of the eye;
  processing application data to render image content for an application for display on the XR device;
  obtaining metadata indicating that a virtual object is to be generated as a hologram as part of the image content for display;
  determining whether the virtual object belongs to a predetermined class of objects and is to be displayed in the focus region; and
  in response to the determining, performing, using a neural network corresponding to the predetermined class of objects, foveated processing of the image content, including at least part of the hologram, such that relatively high-quality image content is generated for display in the focus region and relatively low-quality image content is generated for display outside the focus region.

Further features and advantages of the invention will become apparent from the following description of preferred embodiments of the invention, given by way of example only, which is made with reference to the accompanying drawings.

DETAILED DESCRIPTION

Figure 1:
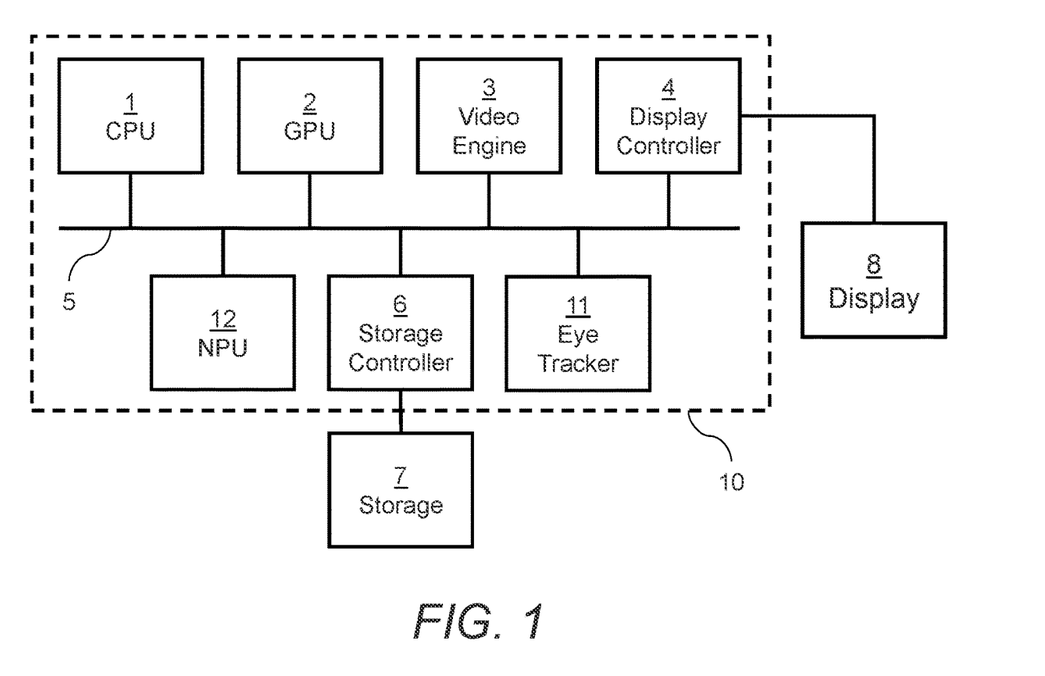
FIG. 1 shows an image processing system for an extended reality device according to examples.

FIG. 1 shows an example image (or "graphics") processing system 10 in the form of a system on a chip (SoC). The image processing system 10 includes a central processing unit (CPU) 1, a graphics processing unit (GPU) 2, a display controller 4, and a storage controller 6. The graphics processing system 10 also includes a video engine 3 in this example. As shown in FIG. 1, these units communicate via an interconnection 5 and have access to off-chip storage 7. In this system, the graphics processing unit (GPU) 2 renders frames (images) to be displayed, and the display controller 4 will then provide the frames to a display system 8, e.g. a holographic display system, for display, e.g. as a computer generated hologram (CGH). The holographic display system 8 includes a (RGB laser) light source and a Spatial Light Modulator (SLM), for example.

In use of the image processing system, an application (such as a game, navigation application, messaging application, or environment analysis application) executing on the CPU(s) 1 will, for example, require the display of frames on the display 8. To do this, the application submits appropriate commands and data to a driver for the GPU 2 that is executing on the CPU 1. The driver will then generate appropriate commands and data to cause the GPU 2 to render appropriate frames for display, and to store those frames in appropriate frame buffers, e.g. in the main storage 7. The display controller 4 will then read those frames from the main storage 7 and send them for display by the display system 8. In examples, the display controller 4 includes a first-in, first-out (FIFO) buffer to mitigate the likelihood of underrun.

In examples, the graphics processing system 10 is configured to provide frames for display, and the GPU 2 is correspondingly configured to render frames, at an appropriate target rate, e.g. 30 frames per second.

In FIG. 1, the display controller 4 is provided as part of the same SoC as the CPU 1 and GPU 2 such that the processing for producing the frames to be displayed for the application, e.g. game, is performed locally to the control of which frames are displayed, e.g. as part of a dedicated gaming console, smartphone or AR/VR headset.

There may be a significant amount of processing power required for producing frames for display for a given application, e.g. especially for modern gaming applications. This has typically required a user to have a relatively high-end hardware system such, as a dedicated gaming console, to provide a smooth gaming experience. Additionally, while VR implementations are typically used indoors with mains power, AR implementations may be used away from mains power, e.g. outdoors, with a battery powered device. Thus, any significant energy demands during running of a given application will impact the battery life of such mobile XR devices.

The technology described herein relates to image (or "graphics") processing systems including a main processor (or processors) executing an application, such as a game, and a graphics processor that is operable to generate frames for the application for display. The graphics processor is thus operable to generate sequences of frames representing the content that is (or may be) desired to be displayed for the application, which frame sequences are then provided for output, e.g. to a suitable display controller, where they are then processed for display, and displayed.

In an embodiment of the technology described herein, the processing resource required for rendering a frame is reduced by the graphics processor rendering one or more region(s) of the frame at a first, higher resolution—e.g. using a higher density of data elements—and rendering other regions of the frame at a second, lower resolution—e.g. using a lower density of data elements. That is, producing a region of a frame at a given quality in embodiments comprises rendering the region of the frame at a given resolution. The density of data elements corresponds to the resolution in examples. The data elements are sample points, for example.

For instance, the first, higher resolution may represent the desired display resolution, e.g., that is visually acceptable for the application. By only rendering part of the frame at the higher resolution, and rendering other regions at a lower resolution, the processing burden, and thus power consumption, can be reduced.

Correspondingly, the amount of data required for storing the frames can also be reduced in this way (compared to rendering the entire frame at the higher resolution), thereby reducing the amount of storage and/or bandwidth resource required for handling the frames.

Other characteristics that may be varied to tailor the quality within a frame, e.g. instead of or in addition to the resolution, include precision (e.g. the amount of data stored for each data element) and/or dynamic range and/or compression quality, etc. In embodiments any one or more of these characteristics may be varied within a frame to produce different regions of the frame at different qualities.

Thus, the difference in quality within the frame may be achieved by the graphics processor rendering different regions at different qualities (e.g. using different resolutions, different precisions, etc.), or may be achieved in any (other) suitable and desired way, e.g. using compression techniques, as will be explained further below.

Thus, in general the effect of the technology described herein is that only part of a frame is produced at the higher quality, whereas other regions can be produced at a lower quality (whether this be by varying the resolution, precision, compression rate, etc.), thus reducing the processing burden, power/energy consumption, amount of storage, and/or bandwidth resource required for handling the frames. Reducing the energy consumption also reduces heat output and can improve battery life for mobile devices. High heat outputs can cause the device to become too hot to handle, and may require active cooling, e.g. with fans, and/or thermal throttling.

In this respect, the technology described herein recognises that for any given frame for a particular future state it is expected that the user will be looking at (and typically only at) a particular region (or regions) of the frame.

The region of a frame that a user is looking at when a frame is displayed may be referred to as a "focus" region (since it corresponds to where the user's gaze is focused) or a "foveal" region (since it corresponds to the user's foveal view, i.e. corresponding to the centre of the eye's retina, the fovea, for a user viewing the frame). Thus, the technology described herein recognises that it is not necessary to produce the entire frame at the highest required, "foveal" quality (e.g. resolution) and that so long as the expected region(s) of interest—the expected foveal region(s)—are produced at the desired quality, other regions of the frame can be produced at a lower quality without significantly impacting the user experience.

Therefore, in the technology described herein, part of a frame (image) that is to be displayed (e.g., and in embodiments, a part of the frame corresponding to the user's expected foveal view for the frame) is produced at a higher quality for display, but other parts of the frame can be (and are) produced, e.g. and displayed, at a lower quality.

This is because the part of the frame that the user is looking directly at may need to be produced at a higher quality for visual acceptability, whereas other, peripheral regions of the frame that the user is not directly looking at can be produced at a lower quality whilst still appearing visually acceptable. This can then be used to reduce the processing burden on the graphics processing system (and correspondingly to reduce the storage/bandwidth/power resource required for handling the rendered output), by producing more peripheral regions of the frame at a lower quality, rather than producing the entire frame being displayed at the highest required, "foveal" quality.

Thus, in an embodiment, one or more "fixation points" within a frame being produced are determined, with the regions further away from the fixation point(s) being produced with a lower quality. Such variation in the image quality based on a "foveal" region of the user's eye may be known as foveated processing or simply "foveation" in the field.

The determination of which region(s) are to be produced at the higher quality may be made in any suitable and desired fashion. In general, which region(s) of a given frame should be produced at the higher quality may depend on the content of the frame in question, which will be determined by the application.

For instance, in some embodiments, the graphics processor may produce the centre region of the (and each) frame in higher quality than the other regions, e.g., where it is expected that the user will be looking at the centre of the frame.

This may be particularly appropriate when rendering images for virtual reality displays, e.g. head-mounted displays (HMDs). For instance, high resolution VR HMDs typically use lenses that feature severe barrel distortion. The effect of this is that the rendered image towards the centre of the display (for each eye) is magnified whereas the peripheral areas are all compressed in size (minified). The effect of this is that the peripheral regions can be produced, e.g. rendered, at a lower quality than the central, magnified region, without any significant loss in the overall visual effect for the user.

In other embodiments, and more generally, the region(s) for a given frame that is produced at the higher quality may be any suitable and desired region(s) of the frame and so need not be the centre region, or at least not only the centre region. For example, if the application is a racing game, and there is an upcoming right turn, it may be expected that the user will be focusing on the centre-right region of the frame, and this region can be produced at the higher quality, accordingly (with other regions produced at a lower quality). Thus, for any given frame, the region(s) produced at the higher quality are, in embodiments, intended to correspond to the expected centre of the eye's retina, the fovea, for a user viewing the frame.

In cases where the frames are generated in advance, e.g. in VR applications, it may not be possible to use the actual position of the user's fovea when looking at a given frame (since the user is not looking at the frame at the point at which the frame is produced). However, it is recognised that it is generally possible to determine, or predict, for a given frame which region(s) of the frame the user is expected to be looking at, and to use this determination of the user's expected foveal view (gaze direction) to determine which region(s) should be produced at the higher quality. That is, the region(s) of a frame that the user is expected to be looking at when the frame is displayed can be predicted in advance, e.g. at the time when the frames are produced. For example, if a user's eye is focussed on a first foveal region in one frame then a prediction can be made, e.g. using the speed at which the human eye can move, of a second, larger, foveal region where the eye may be focussed in a subsequent frame. Thus, the processing burden is reduced. The expected foveal regions can then be produced at a higher quality whereas other regions can be produced at a lower quality to save processing cost for producing the entire frame at the higher quality. In examples, the system includes a focus prediction module configured to predict the gaze (direction) of the user to determine the focus region of the eye.

As mentioned above, the determination of the expected foveal region, and hence the region(s) that should be produced at the higher quality, is in some embodiments made based on the content of the frame, which will be determined by the application. For example, for a given future state of the application (with a corresponding sequence of frames), the application will know, or can determine, which area(s) of the frame(s) are likely to be of interest, and that the graphics processor can, and should, focus processing resource on those areas.

Thus, in such embodiments, the determination of which region(s) of a frame are to be produced at the first, higher quality is based on the content of the frame such that the region(s) that are produced at the first, higher quality include the region(s) of the frame where a user is expected to look at when the frame is displayed.

For example, and in embodiments, each frame represents a view of a scene of one or more objects of potential interest. It may therefore be expected that when the frame is displayed to a user, the user will focus on one or more of the objects in the scene. The region(s) of the frame that include those objects may thus be produced in higher quality, whereas the other peripheral regions of the frame can be produced at lower quality. This may particularly be the case for newly appearing, or moving, objects in the scene, e.g. as these may be expected to draw the user's attention. Thus, in embodiments, the region(s) of the frame that are produced in higher quality include an object that is newly appearing in that frame. In other embodiments, the region(s) of the frame that are produced in higher quality include an object that is moving within the scene. In that case, the region(s) that are produced in higher quality may change from frame to frame within a corresponding frame sequence, e.g. to track the movement of the object.

In other embodiments, the region(s) of the frame that are produced in higher quality may include objects appearing in the foreground of the frame and/or relatively larger objects in the scene. Again, depending on the nature of the application, it may be expected that the user may focus on such objects. Also, in examples where a depth of field effect is used, if the object of interest is relatively sharp while the other areas are relatively blurry, the blurred regions may be computed at a lower quality level.

Where there are multiple objects in the scene represented by a given frame (which may, e.g., include multiple newly appearing, or moving, objects), it may not be possible to reliably predict which of the objects the user will focus on. However, it may still be expected that the user will be focusing on one of the objects. Thus, in embodiments, where a frame represents a view of a scene of a plurality of objects (of potential interest), a respective plurality of regions of the frame including the plurality of objects may be produced in higher quality.

Thus, in embodiments, the frame represents a view of a scene of one or more objects of interest, and wherein the region(s) of the frame that are determined to be produced at the first, higher quality comprise the region(s) of the frame including an object of interest. In some embodiments the frame represents a view of a scene comprising multiple different objects of interest, and two or more different region(s) of the frame that include a respective two or more different objects of interest are produced at the first, higher, quality. As mentioned, if a depth of field effect is used for the images and the object(s) of interest are relatively sharp compared to other regions of a frame, the less-sharp regions may be rendered at a second, lower, quality.

Various other arrangements would be possible in this regard and in general the determination of which region(s), or which object(s), should be produced at higher quality may be made in any suitable and desired fashion, e.g. depending on the application in question.

The determination of which region(s) should be produced at the higher quality for a given frame may be performed in a more or less complex manner, as desired. The determination of which region(s) should be produced at a higher quality may thus take into account, for example, any suitable information that is available about the content of the frame and/or the expected user behaviour, and need not be based solely on the content of the application.

Various arrangements would be possible in this regard. For example, in some embodiments, the system may be operable to track the (actual) movement of the head/gaze of the user, e.g. with an eye-tracker. In that case, even though the frames are generated ahead of time, the user's current head/gaze position and/or movement may still influence where the user is expected to look in the future, and this information may therefore also be used, at least in part, for determining the region(s) that are to be produced at the higher quality, e.g. the expected foveal region(s). That is, by tracking the movement of the user's gaze, it may be possible to predict where the user is likely to look next. For example, if the user's gaze is moving from a first area of the frame to another, it may be relatively unlikely that the user's gaze will return to the first area of the frame, at least for some time interval. As mentioned, using a speed of eye movement and location(s) of initial focus region(s) allows for prediction of the subsequent focus region(s) that the eye(s) will be looking at in subsequent frames. Additionally, during fast eye movement, e.g. saccadic eye movement, the user may not be able to see (a phenomenon known as saccadic masking). Saccadic eye movement is a state of the eye separate to other states such as fixation (maintaining gaze), smooth pursuit, or micro-saccades (smaller, involuntary, movements) during which the user can see. During faster eye motion, saccades, the brain selectively blocks visual processing in such a way that neither the motion of the eye (and subsequent motion blur of the image) nor the gap in visual perception is noticeable to the viewer. Humans become effectively blind during a saccade. Given the current focus point (or region) the area which will be visible to the user at a high-quality level over subsequent frames can be determined. The eye may be able to move faster than this, outside of this region, however the visual quality there can be ignored since the user will not be able to see.

In examples where an eye-tracker and focus prediction module are present, the focus prediction module may obtain eye-tracking data from the eye-tracker, e.g. alongside application data from the application running, to use in predicting subsequent focus regions.

It may also be possible to make early predictions of the expected user action, and to take this information into account when determining which region(s) should be produced at a higher quality. For instance, in some embodiments, the system may receive inputs from electroencephalography (ECG) and/or electromyography (EMG) sensors that can detect a user's muscle/brain activity firing before the actual action. Again, such information may be fed into the determination of which region(s) the user is expected to look at, and which should therefore be produced at the higher quality.

The determination of which region(s) should be produced at a higher quality may also take into account historic user behaviour. For example, if such data is stored for other (e.g. test) users of the game, it may be possible to predict where a user is likely to look based on where other users have looked. Data representing such historic user behaviour may be provided to the focus prediction module, for example. In some cases, a controller (e.g. separate to or part of the CPU 1) makes the determination of the predicted focus region based on data from the prediction block working in coordination with the eye-tracking system.

It is recognised that by producing only some, i.e. less than all, of the regions of the frames in each frame sequence at the desired, highest quality (e.g. resolution, precision, compression rate, etc.), processing resource is saved by producing other regions at a lower quality.

An aspect of this is the recognition that, for any given frame, it is possible to usefully predict, e.g. based on the content of the frame, the user's likely foveal view and to thus determine which region(s) should be produced at a higher quality in order to maintain a visually acceptable display based on the expected foveal regions of the frames. This can reduce the processing required for generating the frames in such a manner to not detriment the user experience.

In other words, examples of the image processing system described herein recognise that for a given sequence of frames, the application will know, or it can be determined, which areas of the frame(s) are likely to be of interest, and that the graphics processor can prioritise processing resource on those areas.

This in turn reduces the processing requirements for producing the frames and correspondingly also reduces the storage/bandwidth/energy required for handling the plurality of frame sequences. For instance, whilst embodiments are described in relation to a single frame, it will be appreciated that each frame (in each future state) may be processed in the same way.

The graphics processing system described herein includes one or more main processors, e.g. CPU, executing an application and a graphics processor, GPU, that is operable to perform graphics processing operations for the application under the control of the main processor. The GPU is thus operable to process data for the application executing on the main processor to render frames for the application for display.

The application that is being executed on the main processor may be any suitable and desired application that requires graphics processing. In some embodiments the application is a game. In other embodiments the application may be a virtual reality (VR) or augmented reality (AR) application.

In these cases, the application generally makes use of user input, as the user's actions will determine the future progression of the application. The graphics processing system should therefore, and in embodiments does, include an input circuit for receiving user inputs. The user inputs may be provided in any suitable and desired form, e.g. depending on the application in question. For example, where the application is a game, one or more user input devices such as a control pad, joystick, etc., may be provided allowing a user to play the game. As another example, the technology described herein may be implemented in a virtual reality (VR) and/or augmented reality (AR) display device such as, and in an embodiment, a virtual reality (VR) and/or augmented reality (AR) headset. For example, in an AR implementation, the input(s) can be made dependent on where the user is located, what they are looking at, their gestures or speech, etc.

The graphics processing system may also include any other suitable user input devices, including, e.g., gaze-tracking sensors and/or EEG/ECG sensors for monitoring a user's activity. The gaze-tracking sensor may for example be provided as part of a head-mounted display (HMD) which may be the processing platform itself, e.g. where the graphics processing system comprises a virtual reality head-mounted display (VR HMD), for example, or may be a separate unit. Information from such sensors may in embodiments be used to allow a better determination of foveal regions for the frames, as mentioned above. However, information from such sensors may also be used to control the application. Various other arrangements would be possible in this regard. For example, a different type of input device which may be included as part of the graphics processing system is a hand-tracking sensor configured to monitor location/movement of the user's hand(s).

Figure 2A:
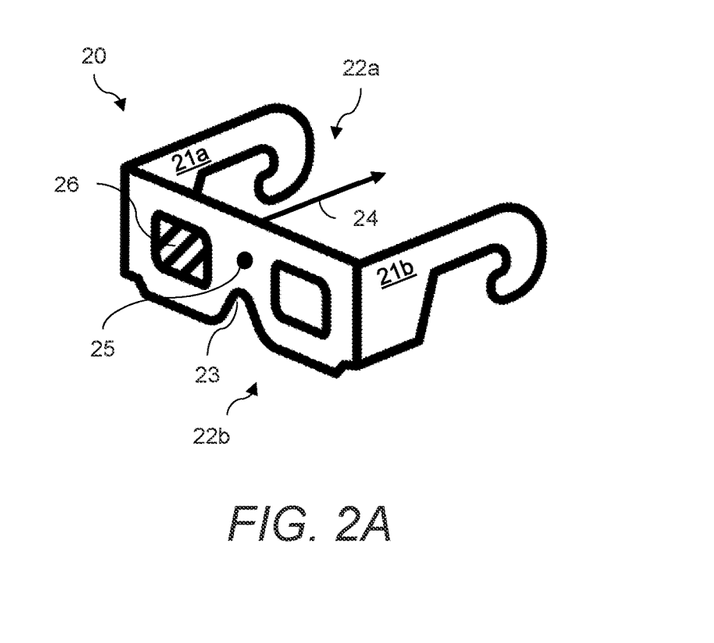
FIG. 2A shows a schematic diagram of an HMD according to examples.

FIG. 2A is a schematic diagram of a head-mounted display (HMD) 20 according to examples herein. An HMD is for example a device that is wearable on a user's head for displaying an image to the user, such as an augmented reality (AR) image, a mixed reality (MR) image or a virtual reality (VR) image. A first side 22*a* of the HMD 20 is for facing a user of the HMD 20. The HMD 20 has a second side 22*b* opposite to the first side 22*a*. The first side 22*a* of the HMD 20 is therefore closer to the user than the second side 22*b* when the HMD 20 is mounted on the user's head.

Returning to the example of FIG. 1, the graphics processing system 10 includes an eye tracking subsystem 11, which may also be referred to simply as an "eye-tracker". The eye tracking subsystem 11, e.g. including an eye-tracking sensor, may be configured to track an eye of a user. Thus, in embodiments where the HMD 20 incorporates the graphics processing system 10, the HMD 20 includes the eye-tracker. For example, the eye-tracker is mounted on the HMD 20 to track one or both eyes 30 of the user wearing the HMD 20.

In examples, an eye-tracking sensor of the eye tracking subsystem 11 comprises an optical eye-tracking sensor which is able to track the motion of one or both eyes 30 of the user by detecting light reflected from the eye 30 of the user with a video camera or other optical sensor. In examples, the eye tracking subsystem 11 illuminates the eye 30 with infrared light, and the optical sensor is visible light, and/or infrared, sensitive. Eye sensors may indicate current eye positional characteristics, provide accurate eye location information, and/or information as to whether the user is aware of the scene at a given time, for example sensing whether the user has their eyes closed, e.g. while blinking. The data output by the eye tracking subsystem 11 may be used to identify or recognize a visual object that the user is focusing on in their external scene. Alternatively, or additionally, the eye tracking subsystem 11 comprises an electrical potential eye sensor which utilizes electrical potentials measured within one or more electrodes placed around an eye 30 of the user. For example, the eye tracking subsystem 11 may utilize electroencephalography (EEG), electromyography (EMG), or electrooculography (EOG) signal detection to track motion of the eye 30 of the user. Electrical potential eye-tracking sensors may provide an indication of movement before movement begins, and hence can provide low latency. The one or more electrodes may be positioned on the HMD 20 such that when the HMD 20 is worn by the user, the one or more electrodes are placed around an eye 122 of the user.

The at least one eye positional characteristic may be indicative of a region of the display 8 determined to correspond to a foveal region of an eye of the user. For example, where the eye positional characteristic is the rotational position of the eye or the direction of a pupil relative to the display 8, it is possible to determine which portion of the display 8 the eye is looking at, and a sub-portion can then be allocated as corresponding to the foveal region of the eye. This is shown schematically in FIG. 2C for a single eye, and it will be appreciated that the concept can be extended for two eyes in a similar manner.

Figure 2B:
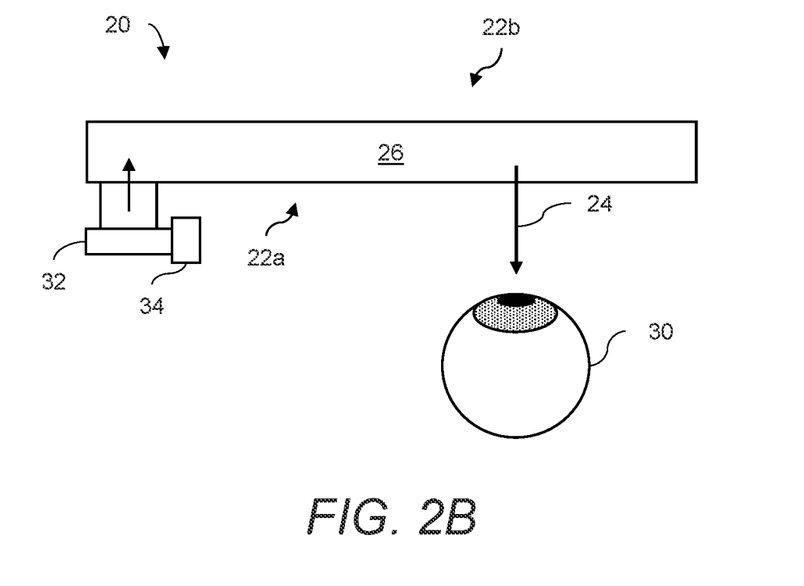
FIGS. 2B and 2C shows a schematic diagram showing features of the HMD of FIG. 2A in more detail.
Figure 2C:
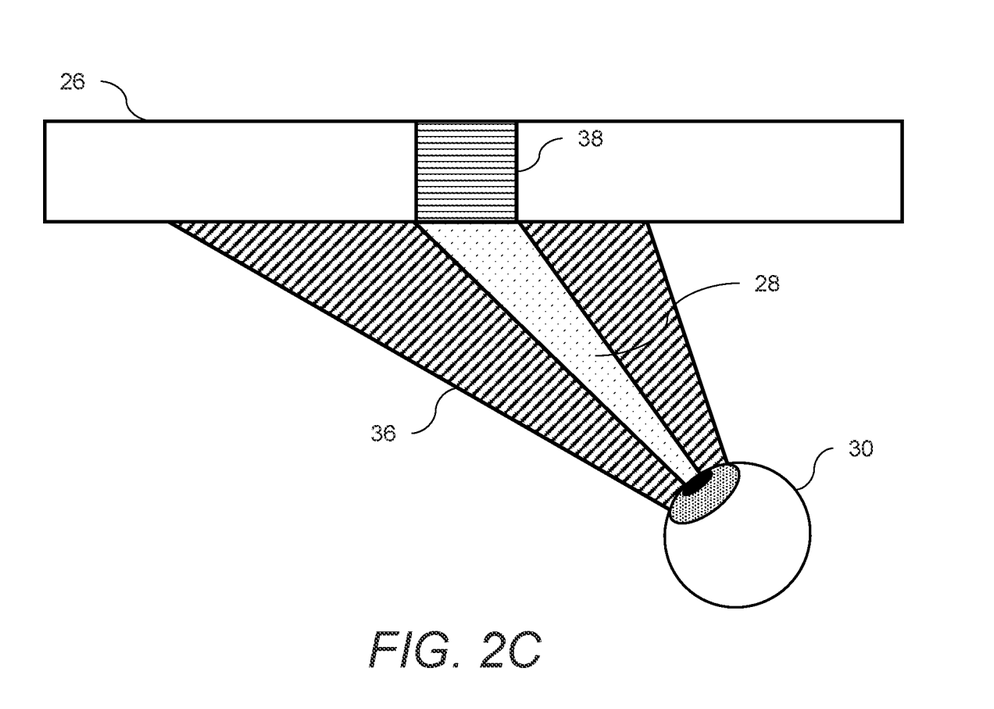

In FIG. 2C, an eye 30 is rotated at approximately 45° relative to a display 26 and has a field of view 36, indicated by the hashed cross-sectional area. A nominal sub-set of the field of view 36 can be taken to correspond to the foveal region 28 of the eye 30, with the foveal region 28 indicated in FIG. 2C by dotted shading. Typically, the foveal region 28 of an eye of a user is around 2° of the field of view 36 of a user, and so the nominal sub-set can be set accordingly. It will of course be appreciated that the size of the foveal region 28 will vary from user to user, and may depend on a distance the display 26 is from the eye 30 (the HMD 20 may sit on the head in a different way for different people), so the device may be calibrated to account for such variation. A determined region 38 of the display 26 may then be taken to correspond to the foveal region 28 of the eye 30, with the determined region 38 indicated by horizontal stripes. It will be appreciated that the size of the foveal region 28 in FIG. 2C may have been exaggerated for clarity. Referring to the image processing system 10 of FIG. 1, the eye tracking sub-system 11 is configured to track the eye of a user including a foveal region of the eye. For example, the eye tracking sub-system 11 includes a microprocessor to process the sensor data from an eye-tracking sensor and determine the foveal region 28 of the eye. In other examples, the eye-tracking subsystem 11 comprises a sensor to capture the eye positional characteristic(s) as sensor data, and the CPU 1 and/or GPU 2 processes the sensor data to determine and track the foveal region 28 of the eye. In examples, machine learning (e.g. an artificial neural network) is used to process the sensor data, and this could be performed on at least one of the CPU 1, GPU 2, or a dedicated processor such as a neural processing unit (NPU) 12, or any combination thereof.

In examples, generated frame sequences are provided for output for display. For example, the produced frame sequences are provided to a display controller and/or other suitable processing unit which the controls which frames are displayed for the application.

As described above, the GPU 2 generates the frames and, in embodiments for each frame the GPU 2 is then able to determine one or more region(s) of interest that are to be produced at a higher quality.

For a given frame, the GPU 2 may thus produce multiple different regions at different qualities. There may, for example, be a gradient of quality within a frame from a highest quality (e.g. at the expected foveal regions) to a lowest quality (e.g. at peripheral regions of the frame). Thus, a given frame may be produced at multiple different qualities such as two, three, four or more different qualities.

For example, the expected foveal regions for a frame may be produced at a first quality, representing the highest quality used for the frame. The other regions of the frame may then be produced using a gradient of different qualities. For example, the foreground of the frame may be produced at substantially the same quality as the expected foveal regions. The background of the frame (excluding any regions thereof that are determined to be produced at the highest quality) may then be produced at, for example, half the quality (e.g. half the resolution) of the expected foveal regions. The peripheral regions at the edges of the frame may then be produced at a lower quality still, e.g. half the quality (resolution) of the background of the frame. However, various arrangements would be possible in this regard and in general the resolutions used may be determined as desired by the processing power of the graphics processing system in question. Each frame may have different foveal regions, although there may be significant overlap). Thus, a (separate) determination of the regions to be produced at a higher quality is, in embodiments, made for each frame that is produced.

Thus, it will be appreciated from the above that the technology described herein provides various improvements in terms of providing reduced processing requirements, e.g. compared to rendering all of the frame, for each frame in a sequence, at a higher resolution.

As will be appreciated from the above, the technology described herein is, in an embodiment, implemented in and as part of an overall graphics processing system 10 that includes one or more of: a main processor (CPU) 1, a GPU 2, a display controller 4, a video processor (codec) 3, an interconnection (e.g. system bus) 5, a storage controller 6, and an eye-tracking subsystem 11.

The main processor may execute applications that can require graphics processing by the GPU, and send appropriate commands and data to the GPU to control it to perform graphics processing operations and to produce (render) graphics processing output required by applications executing on the main processor. To facilitate this, the main processor also executes a driver for the GPU and a compiler or compilers for compiling shader programs to be executed by programmable shading stages of the GPU in embodiments. The compiler may be, and in an embodiment is, a part of the driver. Thus, in an embodiment, the GPU is in communication with a microprocessor, as part of the overall graphics processing system, that executes a driver for the GPU and/or one or more compilers for the GPU. Similarly, in embodiments there is an application on the main processor that indicates a requirement for performing processing operations in the manner of the technology described herein, which requirement is then recognised by (the driver executing on) the main processor, with the (driver on the) host processor then operating to instruct the GPU to render data accordingly. In examples, the GPU renders the frame using rasterization, hybrid-raytracing, or raytracing.

The GPU can, and in embodiments does, include any one or more, and in embodiments all, of the processing stages that a GPU can normally include. Thus, for example, the GPU in embodiments includes a primitive setup stage, a rasteriser, and a renderer. In an embodiment the renderer is in the form of, or includes, a programmable fragment shader.

The GPU is, in embodiments, a tile-based GPU comprising a tile buffer for storing tile sample values and/or a write-out unit that operates to write the data in the tile buffer (e.g. once the data in the tile buffer is complete) out to external (main) storage, e.g. a frame buffer.

The GPU and/or microprocessor are, in embodiments, also in communication with a display for displaying the images generated by the GPU. Thus, in an embodiment, the graphics processing system further comprises a display for displaying the images generated by the GPU, e.g. via the display controller.

The local GPU may perform any further processing graphics required for preparing the frames for display. For example, if the game is executing in a GUI the local GPU may combine (composite) the frames as appropriate with other image content.

In the present embodiments, rather than rendering the frames in their entirety at 'full' resolution, different regions of the frames are rendered at different resolutions, such that only part of the frame is rendered at the desired, highest resolution for display, whereas other parts of the frame are rendered at a lower resolution, thereby saving processing resource without perceptibly reducing image quality of the user. In particular, the regions of the frames that are rendered at the higher resolution correspond to the parts of the frame (image) that a user is looking, or expected to look, at when the frame is being displayed, e.g. the user's expected "foveal view".

Thus, in some embodiments, a prediction is made for each frame that is being produced by the graphics processor of one or more region(s) in the frame that a user is expected to be looking at when the frame is displayed. For example, these may be regions that include objects of interest for the scene that is being represented by the frame.

The graphics processing system 10 may be part of a single processing platform, e.g. a dedicated gaming console or a head-mounted display (HMD). The graphics processing system 10 in embodiments has, or is in communication with, a storage 7 in which image data generated by the GPU may be stored, e.g. for subsequent processing (e.g. via the storage controller 6). Thus, in an embodiment, the graphics processing system 10 and/or GPU 2 comprises, and/or is in communication with, one or more storages 7 and/or storage devices that store the data described herein, and/or that store software for performing the processes described herein (e.g. via the storage controller 6).

The one or more processors 1, 2 of the graphics processing system 10 are configured to process application data to render image content for an application for display on the XR device, e.g. the HMD 20 shown in FIG. 2A. The processor(s) 1, 2 obtains metadata indicating that a virtual object is to be generated as a hologram as part of the image content for display on the XR device 20.

For example, the HMD 20, incorporating the graphics processing system 10, includes a holographic image generator to generate a holographic image of an object, referred to herein as a hologram, based on holographic image data, obtained and processed for generation of the hologram. The display system 8 in FIG. 1 comprises the holographic image generator, for example. Examples of a holographic image generator include a red-green-blue (RGB) laser combined with a reflective spatial light modulator (RSLM), and an RGB laser combined with a micromirror array or a scanning mirror. In examples where the holographic image generator is an RSLM, the RSLM is configured to modulate a phase and/or intensity of an incident light beam generated by the laser. The RSLM may comprise a Liquid Crystal on Silicon (LCoS) panel.

The holographic image generator is configured to generate, during rendering of a hologram, projected light 24 which is directed towards an eye 30 of a user of the HMD 20. In this way, the user can view the hologram.

The example HMD 20 of FIG. 2A includes a display portion 26 for displaying the hologram to the user. The display portion 26 in this case corresponds to the section of the HMD 20 that is used to project light towards the user during the display of the hologram, so that the user can view the hologram. In examples, the HMD 20 has two display portions 26 to display left and right views to the left and right eyes of the user, respectively. Alternatively, the HMD 20 has a combined display to display the left and right views to the left and right eyes. In some cases, the HMD 20 is monocular: having a single display portion 26 for displaying the hologram to a single eye.

The display portion 26 in the example of FIG. 2A is partially transparent so that at least a portion of light incident on the display portion 26 is transmitted through the display portion 26. In this way, the user can view an external scene through the display portion 26. For example, the display portion 26 is a combiner display, e.g. a see-through electronic display, that allows the user to see what is shown on the display screen while still being able to see through it. A hologram displayed by the HMD 20 may appear as if it is superimposed on the external scene in this case. In other cases, though, the luminance of the hologram may be sufficient that the user is unable to perceive the external scene behind the hologram, e.g. if the hologram is displayed using all of the display portion 26 or a region of the display portion 26 corresponding to a field of view of the user. A boundary of the display portion 26, for example, corresponds to a boundary of a frame or other mounting apparatus for mounting the display portion 26. In these cases, the display portion 26 may be taken to correspond to a partially transparent screen region of the HMD 20, which is bounded by a frame (which may be opaque or at least partially opaque to incident light, although need not be).

It is to be appreciated that transmission or reflection of a portion of light as described herein, for example, refers to transmission or reflection of a subset of wavelengths of a range of wavelengths or to transmission or reflection of light (e.g. across the spectrum of wavelengths of visible light) but with a coefficient of transmission or reflection that is less than 1. In examples herein, light is considered to encompass visible light (e.g. with a wavelength from around 400 nm to around 700 nm), but may also include light outside the visible spectrum, such as infrared and/or ultraviolet light.

In FIG. 2A, the display portion 26 is disposed between a first side portion 21a and a second side portion 21b of the HMD 20. In this case, the HMD 20 is in the form of glasses, and the first and second side portions 21a, 21b correspond to arms of the glasses (sometimes referred to as temples), which are stems that extend from each side of the display portion 26. When the HMD 20 is mounted on the user's face, e.g. with a bridge portion 23 of the display portion 26 resting on the user's nose, the first and second side portions 21a, 21b extend along opposite sides of the user's face, and hook or otherwise rest over the user's ears to secure the HMD 20 in place on the user's head. The first and second side portions 21a, 21b each have first and second sides, which form part of the first and second sides 22a, 22b of the HMD 20, respectively. In other words, the first sides of the first and second side portions 21a, 21b are arranged to face the user of the HMD 20, when the HMD 20 is worn by the user. The second sides of the first and second side portions 21a, 21b are opposite to the first sides, and face an external scene with the HMD 20 in use by the user.

At least one of the first or second side portions 21a, 21b may be configured to at least partly prevent transmission of light therethrough, e.g. from the first side 22a of the HMD 20 to the second side 22b of the HMD 20 or vice versa. In the example HMD 20 of FIG. 2A, the first and second side portions 21a, 21b are both configured to prevent transmission of light therethrough at least partly. By at least partly preventing transmission of light through at least one of the first and second side portions 21a, 21b, the privacy of the HMD 20 can be improved, e.g. by reducing visibility of the user to an external observer and/or by reducing leakage of light associated with display of the image by the display device of the HMD 20 to the second side 22b of the HMD 20.

FIG. 2B is a schematic diagram showing features of the HMD 20 of FIG. 2A in more detail. It is to be appreciated that FIG. 2B is not to scale: the size of certain elements has been exaggerated for ease of illustration. As explained with reference to FIG. 2A, the HMD 20 includes a holographic image generator 32 for displaying a hologram. Light emanating from the holographic image generator 32 during the display of the image is directed into a waveguide 26. The waveguide 26 projects the light towards an eye 30 of a user so that the user can view the hologram generated by the holographic image generator 32. Although not shown in FIG. 2B (which illustrates part of the HMD 20 of FIG. 2A), it is to be appreciated that another holographic image generator and waveguide in this case also projects a corresponding hologram towards the other eye of the user. In other cases, the waveguide 26 guides the light towards only one eye of the user, e.g. when implemented in a monocular HMD.

In examples, the waveguide 26 of FIG. 2B is a holographic waveguide, e.g. which includes one or more (reflective) holographic optical elements, HOEs, e.g. of the type by Digilens Inc. or Lumus Ltd. For example, a first set of HOEs reflects incident light and guides the light along the waveguide until the light is incident on a second set of HOEs, which reflect the light out of the waveguide 26. A waveguide combiner, for example, includes input and output couplers. These can be either simple prisms, microprism arrays, embedded mirror arrays, surface relief gratings (SRGs), thin or thick analogue holographic gratings, metasurfaces, or resonant waveguide gratings (RWGs). All of these have their specific advantages and limitations.

The holographic image generator 32 of the HMD 20 is configured to emit projected light 24 which is directed towards the user of the HMD 20 (in this case, towards the user's eye 30) so that the user can view the hologram.

The class of objects to which the virtual object that is to be rendered as a hologram belongs is made is determined— e.g. by the processor(s) 1, 2 or by an external processor and indicated in the metadata—before the hologram is generated.

If the determination confirms that the virtual object belongs to a predetermined class of objects, and is to be displayed in the focus region 28 of the eye(s) 30, the image content to be displayed is foveated—including the hologram—using a neural network. The foveation of the image content, including the hologram, means that relatively high-quality image content is generated for display in the focus region and relatively low-quality image content is generated for display outside the focus region, as described in examples.

According to the present system and methods, the foveation is performed using a neural network, e.g. a recurrent neural network, which corresponds to, e.g. is trained for, the class of objects to which the virtual object belongs. For example, if a virtual car is to be rendered as a hologram in the displayed image content, a recurrent neural network trained on 'car', or genus 'vehicle', objects is used for the foveated processing.

An artificial neural network (ANN) typically includes several interconnected nodes, which may be referred to as artificial neurons, or neurons. The internal state of a neuron (sometimes referred to as an "activation" of the neuron) typically depends on an input received by the neuron. The output of the neuron may then depend on the input, a weight, a bias, and an activation function. The output of some neurons is connected to the input of other neurons, forming a directed, weighted graph in which vertices (corresponding to neurons) or edges (corresponding to connections) of the graph are associated with weights, respectively. The weights may be adjusted throughout training of the ANN for a particular purpose, altering the output of individual neurons and hence of the ANN as a whole.

The neurons may be arranged in layers such that information may flow from a given neuron in one layer to one or more neurons in a successive layer of the neural network. For example, a convolutional neural network (CNN) typically includes an input layer, a plurality of convolutional layers, at least one fully connected layer and an output layer. The input layer may correspond with an input to the neural network, e.g. input image data. The convolutional layers typically extract particular features from the input data to create feature maps. The fully connected layer(s) can then use the feature maps for classification. A fully connected layer typically connects every neuron in one layer to every neuron in another layer. Fully connected layers may therefore be used to identify overall characteristics of an input, such as whether an object of a particular class, or a particular instance belonging to the particular class, is present in an input (e.g. image, video, sound) as part of an object classification process.

An ANN may be trained to perform object detection, classification, image segmentation, image enhancement, sound/speech recognition, etc. by processing sensor-originated data, for example to determine whether an object of a predetermined class of objects is present in the real-world environment represented by the sensor-originated data.

In examples, the neural network used in the foveated processing of the image content, is configured to enhance the image content to a given image quality. For example, where the image quality corresponds to a resolution of the image content, such enhancement may be termed "super-resolution". The neural network produces a reconstruction of the image content by inpainting details to enhance the image quality, to a given level, e.g. resolution, compared to the unenhanced version of the image content. The neural network corresponds to the predetermined class of objects to which the virtual object is to be generated as a hologram as part of the image content for display, as described. The correspondence may be based on a hierarchy of objects, described in more detail below.

The neural network, e.g. recurrent neural network (RNN), may be trained to perform the enhancement of image quality of image content, including holograms, representative of objects belonging to a given class. For example, one ANN is trained to enhance images, holographic or otherwise, of vehicles, while another ANN is trained to enhance images of plants. The class "wheeled vehicles" in this example is a genus- or family-type class which includes subtypes, or species, of the class such as cars, motorbikes, vans, lorries, etc., which share similar features for reconstructing. The single ANN trained for reconstructing a genus class may thus be used for enhancing images of the species within that genus, for example, to save on resources involved in the training and storage of ANNs compared to using species-level ANNs. For example, the ANN trained for reconstructing images of trees may be used to enhance an image of an oak tree and another image of a pine tree. The structure of the hierarchy of objects may be chosen and altered to change the granularity of classes at the different levels of the hierarchy. There may therefore be different networks for different object classes. The object class may be provided as an input to the ANN. Also, respective ANNs may be trained for different regions (resolutions) of an image frame. Alternatively, such information may be provided as an input to the ANN. In examples, other meta data may be provided to the ANN in addition to the image (sample) input. For example, the metadata comprises depth data or surface normal(s). The metadata mat be generated by the GPU. The image data and/or metadata is provided from one or more previous frames in examples.

In an RNN, each node (neuron) in a given layer is connected with a directed (one-way) connection to every other node in the next successive layer. Each node has a time-varying real-valued activation and each connection has a modifiable real-valued weight. As described, nodes may be input nodes (receiving data from outside of the network), output nodes (yielding results), or hidden nodes (that modify the data from input to output). In an RNN, the directed graph formed by the connections between nodes is along a temporal sequence, which allows RNNs to exhibit temporal dynamic behaviour. RNNs can use their internal state (memory) to process variable length sequences of inputs and take information from prior inputs to influence the current input and output. While traditional deep neural networks assume that inputs and outputs are independent of each other, the output of RNNs depend on the prior elements within the sequence.

Like feed forward ANNs and CNNs, RNNs utilize training data to learn. Under supervised learning, target activations can be provided for some output units, whereas in reinforcement learning settings, no target signals are provided and instead, a fitness function or reward function may be used to evaluate the RNN's performance, which influences its input stream through output units connected to actuators that affect the environment. The neural network(s), e.g. RNN(s), used in the present embodiments are trained to enhance the image quality of image content, including holograms, representative of objects belonging to a given class of objects. The training data may thus comprise real image content, including holograms, representative of objects belonging to the given class, for example. An RNN configured to enhance holograms of birds, for example, is trained using real image content, including holograms, of different birds.

Training an ANN may generate one or more kernels associated with at least some of the layers (such as layers of the ANN other than the input and output layers). Hence, the output of the training may be a plurality of kernels associated with a predetermined ANN architecture (for example with different kernels being associated with different respective layers of a multi-layer ANN architecture). The kernels may be of any size. A kernel may sometimes be referred to as a "filter kernel" or a "filter". A convolution operation, performed during processing done by a CNN, generally involves a multiplication operation and an addition operation—sometimes referred to as a multiply-accumulate (or "MAC") operation. Thus, a neural network accelerator configured to implement an ANN may include a multiplier-accumulator (MAC) unit configured to perform these operations.

The kernel data associated with a given layer may be considered to correspond to weight data representative of weights to be applied to data input to the given layer, e.g. image data, as each element of a kernel may be considered to correspond to a weight, respectively. In the case of image data, each of these weights may be multiplied by a corresponding pixel value of an image patch, to convolve the kernel with the image patch. Other layers of the ANN (e.g. a convolutional layer in a CNN) may process a feature map as input and the respective kernels associated with the layers may be convolved with such input feature maps (IFMs). One or more layers of the ANN may alternatively process probability values as input, e.g. probabilities output by a fully connected layer, such that the weights of a kernel associated with such a layer may be multiplied by the input probability values.

After the training phase, the artificial neural network (which may be referred to as a trained neural network) can be used to enhance the image quality of image content, including holograms, representative of objects belonging to a given class of objects. For example, the trained neural network is able to reconstruct a generated hologram of an object belonging to the object class for which the ANN has been trained. The reconstruction may be done by inpainting details to enhance the image quality to a given level, e.g. resolution, compared to the unenhanced hologram.

The enhancement of the image content by the ANN is done as part of the foveated processing performed by the processor(s) of the graphics processing system 10.

For example, the foveated processing of the image content rendered by an application (for display to the user, e.g. on the HMD 20) involves sampling the image content according to a sampling pattern (or "mask"). In examples, the sampling pattern comprises a stochastic sampling pattern. The sampling pattern comprises a number of sampling points. In examples, the sampling pattern is determined based on the focus region. For example, the given number of sampling points in the sampling pattern is determined based on the focus region in addition, or alternatively, to an arrangement of the given number sampling points according to the sampling pattern. In examples, the given number of sampling points depends on the utilised neural network (e.g. how the network is trained), the resolution of the display, and/or the quality level of the output.

The trained neural network may therefore be used to enhance the sampled image content to the relative image content quality in each region, e.g. inside and outside the focus region. As described in earlier examples, for a given frame (of image content) multiple different regions may be produced at different qualities. There may, for example, be a gradient of quality within a frame from a highest quality (e.g. at the expected foveal regions) to a lowest quality (e.g. at peripheral regions of the frame). Such a quality gradient within the frame can reduce the appearance of a 'hard' border between regions of higher and lower quality, e.g. resolution, in the image when viewed. Thus, a given frame may be produced at multiple different qualities such as two, three, four or more different qualities. Similarly, if the frames are divided into tiles, a given tile may be produced at multiple different qualities such as two, three, four or more different qualities. The number of different quality levels per tile is dependent on the tile size, for example, with larger tile sizes (e.g. 128×128 pixels) having more quality levels compared to smaller tile sizes (e.g. 16×16 pixels). In some cases, there is a single quality level per tile. The trained neural network is therefore used to enhance the (stochastically) sampled image content to the relative image content quality in a given region, for example.

In some examples, the display processor is configured to enhance the sampled image content using the neural network and output the enhanced image content for display, e.g. on the HMD 20. For example, the GPU generates the image content (as a frame) and stores it in the frame buffer. The display processor accesses the frame buffer and the RNN is applied to enhance the image content, as described in examples. By applying the RNN at the display processor, the amount of image data written to storage (between the GPU and display controller) is reduced. Furthermore, display controllers are typically deterministic (since there is a set number of frames to output, and a known data rate), as are neural networks. In other words, both components typically know how much work is required to generate the output information, and the data rate (throughput) required. The amount of information, processing, and time is deterministic at the display controller and the enhancement RNN. Thus, there is a processing compatibility between the two components. In some cases, the display controller also receives metadata indicating the particular RNN needed for a given frame (or tile—the display processor may process the data tile-by-tile, as described for GPUs in examples), e.g. based on the virtual object to be generated in the frame (or tile).

In other examples, it is the GPU which uses the neural network to enhance the image content. In such cases, the enhanced image content is written to the frame buffer and read into the display controller for output to a display, e.g. on the HMD 20. In either case, the neural network may be run on a neural accelerator (e.g. as part of, or connected to, the display processor or GPU). For example, the neural accelerator (or neural processing unit, NPU) 12 is connected to the bus 5 of the graphics processing system 10 shown in FIG. 1.

In some cases, the processor(s) sample and enhance the image content (using the neural network) further based on an available processing capacity of the processor(s) using the neural network. The neural network resource capacity is limited, and may be used in other ways, e.g. by other applications running on the processor(s), meaning that performance could be affected when the neural network resource capacity is nearly or fully used up. Thus, the neural-enhanced foveation may not only depend on the class of virtual object and its location in the frame, e.g. inside or outside the foveal region, but also on the available resource capacity of the neural network system, e.g. the neural network accelerator 12, storage therefor, etc. For example, the graphics processing system is configured to switch from the neural-enhanced foveation of the generated image content to displaying the image content at it is generated, e.g. "full", resolution—e.g. without foveation. The switch between such processing states of the processor(s) is caused by the processor(s) obtaining a trigger, for example. The trigger may be an indication that a processing capacity of the processor(s) using the neural network is constrained. For example, the trigger is an indication that the available processing capacity NPU 12 has dropped below a capacity threshold.

As described in examples, the neural network to be used in the neural-enhanced foveation of the image content is selected based on the virtual object (to be generated and displayed as a hologram) belonging to a particular class of objects, e.g. in an object hierarchy. Thus, in examples, the processor(s) are configured to load, based on the determination that the virtual object belongs to the particular class of objects, the neural network corresponding to that class of objects into storage accessible by the processor(s). For example, the graphics processing system 10 may comprise, or have access to, storage to store one or more trained neural networks (models). On identifying the class of objects to which the intended hologram object belongs, the processor(s) of the graphics processing system 10 may load the corresponding neural network (model) into the storage accessible by the processor(s) ready to use. In examples, the GPU then processes the regions (tiles) in the scene with those classes of objects, thereby increasing locality. This reduces the amount of time that different networks are fetched, improving efficiency etc. Different neural networks (models) corresponding to different object classes are swapped in and out of the storage as different objects in a scene, for example, are enhanced as part of the neural-enhanced foveation. The number of neural networks (models) that can be stored in the storage depends on the storage capacity, e.g. an available storage capacity specifically for neural networks, data size of the neural networks (models), etc.

In examples, the processor(s) are configured to load the selected neural network into the storage accessible by the processor(s) based on where the user is located. For example, scene analysis of a scene captured by an image sensor 25 on the HMD 20 can inform the graphics processing system 10 as to what objects are likely to be in a vicinity of the user. For example, based on the scene analysis determining that the user is looking around a zoo environment, the processor(s) load one or more neural networks corresponding to exotic animals into the storage. The number of neural networks loaded may depend on the hierarchy structure, e.g. a granularity thereof. For example, "exotic animals" may be a superfamily of object classes in the hierarchy, comprising multiple family-level object classes (e.g. primates, big cats, etc.) which are loaded into the storage for use in the neural-enhanced foveation.

Similarly, a location of the user in a real or virtual space may be used in determining which neural network models to load for into the storage for use in the neural-enhanced foveation. For example, in a VR context, the location of the user may be relative to the virtual space of a game. The game may have an area where a road is prominent in the scene, for example, and so the user being located near the road in the game may cause the neural networks corresponding to "wheeled vehicles" being loaded into the storage, since it is likely that the user will be seeing wheeled vehicles on the road in the game. In examples, the loading of specific neural network models corresponding to respective object classes is based on a distribution of objects according to the application, e.g. how the application distributes virtual objects in different locations.

As described in examples above, the neural-enhanced foveation is performed on the image content, including a hologram of a virtual object, when the processor(s) determine that (i) the virtual object belongs to a particular class of objects, and (ii) is to be displayed in the foveal region.

In examples, the processor(s) generate the hologram as part of rendering the image content, e.g. using the holographic image generator described in earlier examples, based on holographic image data obtained and processed for generation of the hologram. The holographic image generator includes an RGB laser combined with a reflective spatial light modulator (RSLM), a micromirror array, or a scanning mirror, for example. The RSLM may comprise a Liquid Crystal on Silicon (LCoS) panel.

In examples, the processor(s) are coupled to a display 8 (26 shown as part of the HMD 20 in FIGS. 2A, 2B), e.g. via the display controller 4. The display 8, 26 is used to project light generated and emitted by the holographic image generator towards an eye 30 of the user during the display of the hologram, so that the user can view the hologram. The light travels through a holographic waveguide 26, for example, which projects the light towards the eye 30 of a user so that the user can view the hologram generated by the holographic image generator 32.

In examples, if it is determined that the virtual object is to be displayed exclusively outside the focus region, e.g. without a part of the virtual object inside the focus region, the processor(s) are configured to render the image content without generating the hologram. For example, if the focus region(s) and the intended virtual object location do not overlap in the scene, the computer-generated holography may not be used. Instead, the virtual object may be rendered non-holographically, e.g. in a "classical" way without use of a diffraction pattern.

Similarly, in examples, if it is determined that the virtual object is to be displayed at an apparent distance beyond a predetermined distance threshold (e.g. is relatively far away from the user in the scene), at a luminance below a predetermined luminance threshold (e.g. is relatively dark in the scene), and/or at a level of obfuscation above a predetermined obfuscation threshold (e.g. is too obscured in the scene), the processor(s) are configured to render the image content without generating the hologram. Instead, the virtual object may be rendered non-holographically, e.g. in a "classical" way without use of a diffraction pattern.

Computer-generated holography (CGH) is computationally intensive—thus, these determinations by the processor(s) to limit the amount of CGH processing in certain circumstances may reduce the overall processing burden on the processor(s).

As described in earlier examples, the image content rendered for display on the HMD 20 may comprise one or more (image/video) frames. In some cases, the frames are rendered as a plurality of tiles, each tile being processed separately by the processor(s) according to a "tiled rendering" process. In such cases, the tiles may be processed such that multiple tiles containing objects belonging to the same class of objects are processed together (e.g. substantially simultaneously) or successively. For example, the tiles are processed substantially simultaneously when they have begun being processed within a predetermined timeframe of each another. Thus, the loading of the respective neural networks corresponding to the different classes of objects is reduced compared to processing the tiles in a standard order.

In examples where the neural network used to enhance the image content, as part of the foveated processing, is an RNN, earlier frames in a sequence of frames may be input into the RNN along with a current frame. This may utilise the temporal dynamic behaviour of RNNs, whereby the internal state (memory) of the RNN allows it to take information from prior inputs to influence the current input and output. Instead of assuming that inputs and outputs are independent of each other, the output of the trained RNN depends on the prior elements within the frame sequence.

Figure 3:
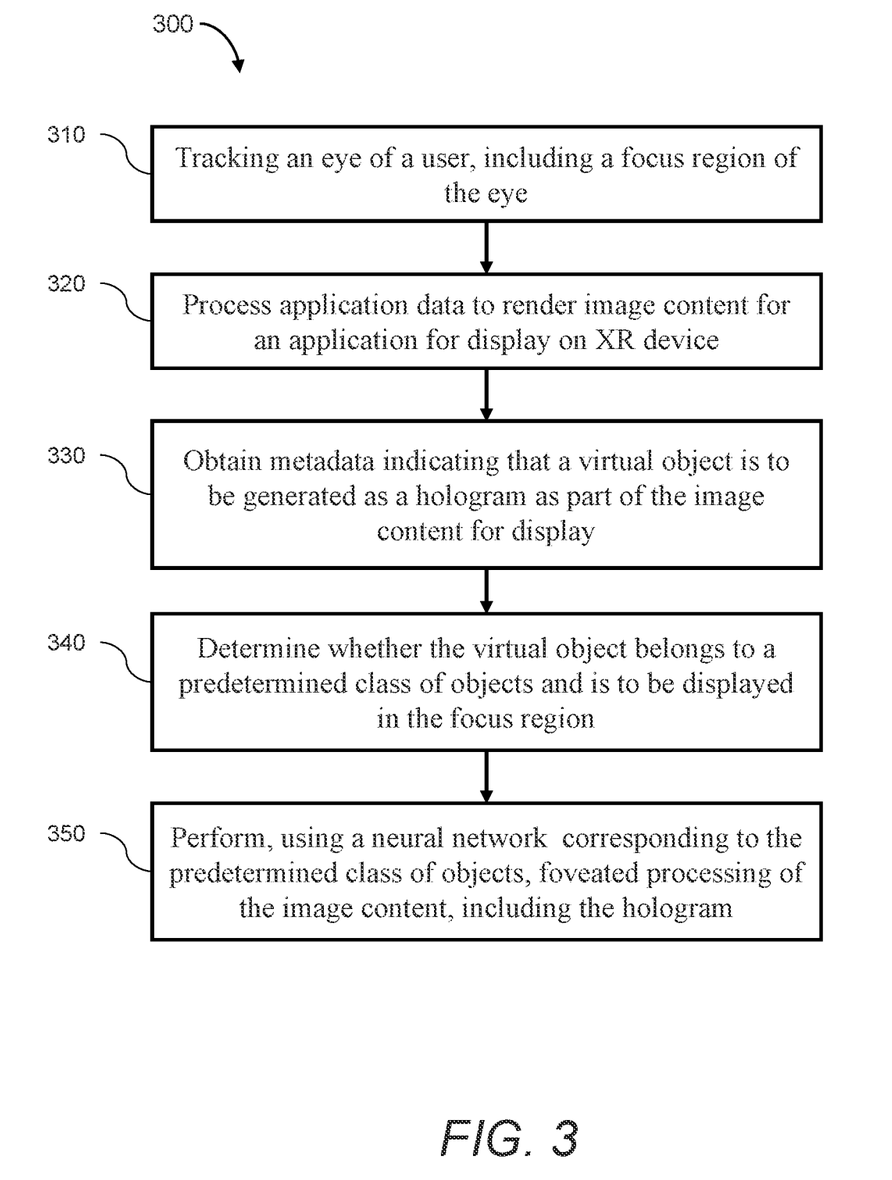
FIG. 3 shows a method of controlling an image processing system for an extended reality device according to examples.

FIG. 3 shows an example method 300 of controlling an image processing system for an XR device, e.g. the HMD 20 of previous examples.

The method 300 includes, at block 310, tracking an eye of a user, including a focus (or foveal) region of the eye. The eye tracker described in examples of the system may be used for this purpose. The determination of the focus region of the eye may be done on a (micro)processor as part of the eye tracker and/or on the processor(s) of the image processing system, e.g. CPU.

The method 300 includes, at block 320, processing application data to render image content for an application for display on the XR device. For example, the application may be running on the processor(s), e.g. CPU, to provide the XR experience to the user. The processor(s), e.g. GPU, thus process the application data to render the image content that is to be displayed on the XR device according to the application running.

The method 300 also involves obtaining metadata indicating that a virtual object is to be generated as a hologram as part of the image content for display (block 330). For example, by processing the application data to render the image content, the processor(s) determine that a holographic object is to be generated and displayed to the user.

A determination is made (block 340) as to whether (i) the virtual object belongs to a predetermined class of objects, and (ii) is to be displayed in the determined focus region.

The method 300 then involves, in response to determining that (i) and (ii) are 'true', performing foveated processing of the image content, including the hologram, using a neural network corresponding to the predetermined class of objects (block 350). The neural-enhanced foveation means that relatively high-quality image content is generated for display in the focus region and relatively low-quality image content is generated for display outside the focus region.

Thus, relatively high-quality image content may be generated for display where it is needed, for example at a region of the XR device's display corresponding to a foveal region of an eye of a user, while relatively low-quality image content may be generated for display elsewhere on the display. This may reduce a graphics computing requirement, e.g. on the graphics processor.

The technology described herein can be implemented in any suitable system, such as a suitably configured microprocessor-based system. In an embodiment, the technology described herein is implemented in a computer and/or micro-processor-based system.

The various functions of the technology described herein can be carried out in any desired and suitable manner. For example, the functions of the technology described herein can be implemented in hardware or software, as desired. Thus, for example, unless otherwise indicated, the various functional elements, stages, and "means" of the technology described herein may comprise a suitable processor or processors, controller or controllers, functional units, circuits/circuitry, processing logic, microprocessor arrangements, etc., that are operable to perform the various functions, etc., such as appropriately dedicated hardware elements (processing circuits/circuitry) and/or programmable hardware elements (processing circuits/circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuits/circuitry, etc., if desired.

Furthermore, any one or more or all of the processing stages of the technology described herein may be embodied as processing stage circuits/circuitry, for example, in the form of one or more fixed-function units (hardware; processing circuits/circuitry), and/or in the form of programmable processing circuits/circuitry that can be programmed to perform the desired operation. Equally, any one or more of the processing stages and processing stage circuits/circuitry of the technology described herein may be provided as a separate circuit element to any one or more of the other processing stages or processing stage circuits/circuitry, and/or any one or more or all of the processing stages and processing stage circuits/circuitry may be at least partially formed of shared processing circuits/circuitry.

Subject to any hardware necessary to carry out the specific functions discussed above, the components of the graphics processing system can otherwise include any one or more or all of the usual functional units, etc., that such components include.

The methods in accordance with the technology described herein may be implemented at least partially using software, e.g. computer programs. It will thus be seen that, when viewed from further embodiments, the technology described herein provides computer software specifically adapted to carry out the methods described herein when installed on: a data processor; a computer program element comprising computer software code portions for performing the methods herein described when the program element is run on a data processor; and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a display controller, or microprocessor system comprising a data processor, causes, in conjunction with said data processor, said display controller or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods described herein need be carried out by computer software and thus the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in any of several programming languages for use with many computer architectures or operating systems. Further, such instructions may be stored using any storage technology, present or future, including but not limited to, semiconductor, magnetic, or optical storage, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

The above embodiments are to be understood as illustrative examples. Further embodiments are envisaged. For example, while many of the described embodiments involve an HMD as the XR device, in other cases the device comprises a (holographic) heads-up display (HUD)—e.g. for use in an automotive vehicle.

A further embodiment may provide an image processing system for an extended reality, XR, device, the image processing system comprising: an eye-tracking subsystem configured to track an eye of a user for determining a focus region of the eye; at least one processor configured to: process application data to render image content for an application for display on the XR device; obtain metadata indicating that a virtual object is to be generated as a hologram as part of the image content for display; based on a determination that the virtual object belongs to a predetermined class of objects and is to be displayed in the focus region: perform, using a neural network corresponding to the predetermined class of objects, foveated processing of the image content, including at least part of the hologram, such that relatively high-quality image content is generated for display in the focus region and relatively low-quality image content is generated for display outside the focus region.

The at least one processor may be configured to sample the image content according to a sampling pattern as part of the foveated processing.

The sampling pattern may be determined based on the focus region.

The sampling pattern may comprise a stochastic sampling pattern.

The at least one processor may be configured to use the neural network to enhance the sampled image content to the relative image content quality in each region.

The at least one processor may comprise a display processor configured to enhance the sampled image content using the neural network and output the enhanced image content for display on the XR device.

The at least one processor may be configured to sample the image data, and enhance the sampled image data using the neural network, further based on an available processing capacity of the at least one processor using the neural network.

The image content may comprise an image frame. The video frame may be rendered as a plurality of tiles, each tile being processed separately. The plurality of tiles may be processed such that multiple tiles containing objects belonging to the same predetermined class of objects are processed together or successively.

The video frame may belong to a sequence of video frames. The at least one processor may be configured to input the video frame, along with one or more preceding video frames in the sequence, into the neural network to enhance the image content to the relative image content quality in each region.

The at least one processor may be configured to load, based on the determination that the virtual object belongs to the predetermined class of objects, the neural network corresponding to the predetermined class of objects into storage accessible by the at least one processor.

The at least one processor may be configured to load the neural network, into storage accessible by the at least one processor, based on at least one of: scene analysis of a scene captured by an image sensor of the XR device; or a location of the user in a real or virtual space.

The neural network may comprise a recurrent neural network.

The at least one processor may comprise a neural network accelerator configured to run the neural network.

The at least one processor may be configured to generate, based on the determination that the virtual object is to be displayed in the focus region, the hologram as part of rendering the image content.

The at least one processor may be configured to render the image content without the hologram based on a determination that the virtual object is to be displayed exclusively outside the focus region.

The at least one processor may be configured to render the image content without the hologram based on a determination that the virtual object is to be displayed at one or more of:
an apparent distance beyond a predetermined distance threshold;
a luminance below a pre-determined luminance threshold; or
a level of obfuscation above a predetermined obfuscation threshold.

The at least one processor may be configured to render the image content without the hologram by rendering the virtual object non-holographically.

The at least one processor may be configured to perform the foveated processing using the neural network when in a first processing state. The at least one processor may be configured to switch, on obtaining a trigger, to a second processing state in which the foveated processing of the image content is not performed. The trigger may comprise an indication that a processing capacity of the at least one processor using the neural network is constrained.

The image processing system may comprise a focus prediction module configured to predict a gaze of the user for the determining of the focus region of the eye.

An XR device may be provided comprising the image processing system described above.

An embodiment may provide a method of controlling an image processing system for an extended reality, XR, device, the method comprising: tracking an eye of a user, for determining a focus region of the eye; processing application data to render image content for an application for display on the XR device; obtaining metadata indicating that a virtual object is to be generated as a hologram as part of the image content for display; determining whether the virtual object belongs to a predetermined class of objects and is to be displayed in the focus region; and in response to the determining, performing, using a neural network corresponding to the predetermined class of objects, foveated processing of the image content, including at least part of the hologram, such that relatively high-quality image content is generated for display in the focus region and relatively low-quality image content is generated for display outside the focus region.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. An image processing system for an extended reality, XR, device, the image processing system comprising:
an eye-tracking subsystem configured to track an eye of a user for determining a focus region of the eye;
at least one processor configured to:
process application data to render image content for an application for display on the XR device;
obtain metadata indicating that a virtual object is to be generated as a hologram as part of the image content for display;
based on a determination that the virtual object belongs to a predetermined class of objects and is to be displayed in the focus region:
perform, using a neural network corresponding to the predetermined class of objects, foveated processing of the image content, including at least part of the hologram, such that relatively high-quality image content is generated for display in the focus region and relatively low-quality image content is generated for display outside the focus region.

2. An image processing system according to claim 1, wherein the at least one processor is configured to sample the image content according to a sampling pattern as part of the foveated processing.

3. An image processing system according to claim 2, wherein the sampling pattern is determined based on the focus region.

4. An image processing system according to claim 2, wherein the sampling pattern comprises a stochastic sampling pattern.

5. An image processing system according to claim 2, wherein the at least one processor is configured to use the neural network to enhance the sampled image content to the relative image content quality in each region.

6. An image processing system according to claim 5, wherein the at least one processor comprises a display processor configured to enhance the sampled image content using the neural network and output the enhanced image content for display on the XR device.

7. An image processing system according to claim 1, wherein the at least one processor is configured to sample the image data, and enhance the sampled image data using the neural network, further based on an available processing capacity of the at least one processor using the neural network.

8. An image processing system according to claim 1, wherein the image content comprises a video frame.

9. An image processing system according to claim 8, wherein the video frame is rendered as a plurality of tiles, each tile being processed separately.

10. An image processing system according to claim 9, wherein the plurality of tiles is processed such that multiple tiles containing objects belonging to the same predetermined class of objects are processed together or successively.

11. An image processing system according to claim 8, wherein the video frame belongs to a sequence of video frames and the at least one processor is configured to input the video frame, along with one or more preceding video frames in the sequence, into the neural network to enhance the image content to the relative image content quality in each region.

12. An image processing system according to claim 1, wherein the at least one processor is configured to load, based on the determination that the virtual object belongs to the predetermined class of objects, the neural network corresponding to the predetermined class of objects into storage accessible by the at least one processor.

13. An image processing system according to claim 1, wherein the at least one processor is configured to load the neural network, into storage accessible by the at least one processor, based on at least one of:
 scene analysis of a scene captured by an image sensor of the XR device; or
 a location of the user in a real or virtual space.

14. An image processing system according to claim 1, wherein based on the determination that the virtual object is to be displayed in the focus region, the at least one processor is configured to generate the hologram as part of rendering the image content.

15. An image processing system according to claim 1, wherein based on a determination that the virtual object is to be displayed exclusively outside the focus region, the at least one processor is configured to render the image content without the hologram.

16. An image processing system according to claim 1, wherein based on a determination that the virtual object is to be displayed at one or more of:
 an apparent distance beyond a predetermined distance threshold;
 a luminance below a pre-determined luminance threshold; or
 a level of obfuscation above a predetermined obfuscation threshold;
 the at least one processor is configured to render the image content without the hologram.

17. An image processing system according to claim 1, wherein the at least one processor performs the foveated processing using the neural network when in a first processing state, the at least one processor being configured to switch, on obtaining a trigger, to a second processing state in which the foveated processing of the image content is not performed.

18. An image processing system according to claim 17, wherein the trigger comprises an indication that a processing capacity of the at least one processor using the neural network is constrained.

19. An image processing system according to claim 1, comprising a focus prediction module configured to predict a gaze of the user for the determining of the focus region of the eye.

20. A method of controlling an image processing system for an extended reality, XR, device, the method comprising:
 tracking an eye of a user, for determining a focus region of the eye;
 processing application data to render image content for an application for display on the XR device;
 obtaining metadata indicating that a virtual object is to be generated as a hologram as part of the image content for display;
 determining whether the virtual object belongs to a predetermined class of objects and is to be displayed in the focus region; and
 in response to the determining, performing, using a neural network corresponding to the predetermined class of objects, foveated processing of the image content, including at least part of the hologram, such that relatively high-quality image content is generated for display in the focus region and relatively low-quality image content is generated for display outside the focus region.

* * * * *